United States Patent [19]
Lagos

[11] 3,897,360
[45] July 29, 1975

[54] MANGANESE AND CERIUM ACTIVATED BARIUM CALCIUM ORTHOPHOSPHATE PHOSPHOR

[75] Inventor: Costas C. Lagos, Danvers, Mass.

[73] Assignee: GTE Sylvania Incorporated, Danvers, Mass.

[22] Filed: Oct. 10, 1972

[21] Appl. No.: 296,012

[52] U.S. Cl. ......................................... 252/301.4 P
[51] Int. Cl. ............................................. C09k 1/36
[58] Field of Search ............................. 252/301.4 P

[56] References Cited
UNITED STATES PATENTS
3,525,698   8/1970   Leto et al. .................... 252/301.4 P FOREIGN PATENTS OR APPLICATIONS
717,761    11/1954   United Kingdom .......... 252/301.4 P
1,004,144   9/1965   United Kingdom .......... 252/301.4 P
1,009,489  11/1965   United Kingdom .......... 252/301.4 P OTHER PUBLICATIONS
Kreidler, "J. Electrochem. Soc.," Vol. 118, No. 6, pp. 923–929, 1971.

Primary Examiner—Jack Cooper
Attorney, Agent, or Firm—James Theodosopoulos

[57] ABSTRACT

Barium calcium orthophosphate activated by manganese and trivalent cerium is a stable, bright red emitting phosphor when formulated within narrow compositional limits.

2 Claims, No Drawings

MANGANESE AND CERIUM ACTIVATED BARIUM CALCIUM ORTHOPHOSPHATE PHOSPHOR

DESCRIPTION OF THE PRIOR ART

Cerium is a well-known dopant which can be used, either by itself or in conjunction with other activators, to activate various compounds or compositions resulting in luminescent materials. The preparation of these materials always involves the use of either inert or reducing atmospheres during their firing step in order to maintain or to obtain the +3 valence state of cerium. See, for example, U.S. Pat. No. 2,750,344, column 3, line 9; 2,488,719, column 3, line 30; 2,455,415, column 2, line 17; 2,455,413, column 2, line 27; 2,467,689, column 1, line 43; 3,014,877, column 2, line 3; 3,525,698, column 2, line 4; and 3,597,365, column 1, line 59. The trivalent state, rather than the more common +4 valence state is the valence state that gives luminescence in cerium activated phosphors. No luminescent material has yet to be reported where the +4 valence state of cerium is the activator.

In almost all previous cases when a phosphor activated with +3 cerium has been prepared and placed in fluorescent lamps, it begins to rapidly deteriorate almost immediately because of the instability of the +3 valence state. The +3 state is fairly easily oxidized to the nonluminescent +4 state during both fluorescent lamp processing and lamp operation. This instability is confirmed by the fact that no +3 Ce activated phosphor, even though there are many such materials, is commercially used in fluorescent lamps.

This invention discloses a +3 Ce activated phosphor that is extremely stable to both fluorescent lamp processing and fluorescent lamp operation. Also, this phosphor is prepared by firing in air and therefore does not require any special inert or reducing atmosphere.

SUMMARY OF THE INVENTION $Ba_{.152}Ca_{2.528}(PO_4)_2:Ce_{.15}Mn_{.09}$ is the preferred composition of the stable +3 Ce activated phosphor of this invention. This phosphor is a bright red phosphor peaking at 650 nanometers with a width at halfheight of 82 nm. When measured by a plaque tester, the phosphor is about 80% as intense as the well-known manganese activated magnesium fluorogermanate and magnesium arsenate phosphors, which peak at about the same region of the spectrum as the instant phosphor. An advantage of the instant phosphor, however, is that it is quite inexpensive to prepare, in relation to both raw material cost and processing cost. Total cost per pound of this phosphor is about one thirtieth the cost of the fluorogermanate phosphor. Except for the fluorogermanate and arsenate phosphors, the instant phosphor is the brightest and most stable 650 nm peaking phosphor that has been reported.

A phosphor in accordance with this invention may deviate somewhat from the preferred composition and still be bright and stable enough for fluorescent lamp use and to be air fired without changing the +3 valency of the cerium. The formula of said phosphor may be expressed as $Ba_aCa_b(PO_4)_2:Ce_cMn_d$ where a is between 0.1 and 0.45 moles, c is between .05 and .25 moles, d is between .07 and .2 moles, and b has such a value that the total positive charges of $Ba^{+2}$, $Ca^{+2}$, $Ce^{+3}$ and $Mn^{+2}$ is between 5.85 and 6.0. Any minor deviation of positive charge concentration of about 0.2 less than +6.0 results in a brightness decrease of about 30% and a slight discoloration in the body color of the phosphor from white to pink. A greater than 0.2 decrease in the positive charge concentration in the formulation results in an 80 percent decrease in brightness and a moderately strong violet red body color. Any positive charge concentration greater than +6.0 results in the same 80 percent decrease in brightness and the same strong violet red body color. This need for exact stoichiometry is probably what gives the phosphor its execellent stability. Apparently, the +3 Ce in this particular compound matrix is tied up in a manner that prevents it from being oxidized to the +4 Ce valence state. When the positive charge stoichiometry is varied away from 5.85 to 6.0, the +3 Ce is no longer tied up and it can then be more easily changed from either the +3 to +4, or the +4 to +3 valence states. The latter step may be accomplished simply by taking a poor brightness, air fired, off stoichiometry material, say, +5.7 positive charge, and firing it in a reducing atmosphere. The phosphor is now quite bright and white in body color, but very unstable to even minor heating in air and also to lamp processing. However, the +5.85 to +6.0 charge stoichiometry phosphor can be processed in lamps and even reheated to 1200°C in air for at least half an hour without any appreciable decrease in brightness. It can also be ground fairly substantially with a mortar and pestle without any significant brightness loss.

The barium calcium orthophosphate is also the only one that gives this stable air fired phosphor. If either barium or calcium is omitted and only the remaining element is used, even with the +6.0 stoichiometry, the same stable effect is not achieved. Pure $Ba_3(PO_4)_2:Ce$, Mn gives an unstable U.V. emission, rather than a red emission, and only when fired in a reducing atmosphere, while $Ca_3(PO_4)_2:Ce$, Mn gives an unstable red emission (about 80% as bright as the barium calcium orthophosphate phosphor) which can only be obtained by firing in a reducing atmosphere. Air fired $Ca_3(PO_4)_2:Ce$, Mn will not produce a good red emitting phosphor no matter what stoichiometry is used.

X-ray diffraction data obtained from the $Ba_{.152}Ca_{2.528}(PO_4)_2:Ce_{.15}Mn_{.09}$ phosphor shows that it has the same pattern as that of pure beta calcium orthophosphate. This pattern persists even up to a barium substitution for calcium of 0.28 moles. Concentrations of barium greater than 0.28 moles result in reduced phosphor brightness and changes in the X-ray diffraction pattern. Apparently, the small concentration of barium (.152 moles) that is substituted for calcium in the beta $Ca_3(PO_4)_2$ structure, in addition to the +6.0 stoichiometry, is also in some unknown way a key toward stabilizing the cerium in the +3 valence state.

Various amounts of other cations and anions have been substituted for the $Ba^{+2}$ and $Ca^{+2}$ cations, and the $PO_4^{-3}$ anion in the optimum phosphor formulation ($Ba_{.152}Ca_{2.528}(PO_4)_2:Ce_{.15}Mn_{.09}$) without any improvements in the phosphor brightness. In many cases, the phosphor brightness was only slightly reduced by the substituted ion by simply a dilution process, but in other cases drastic decreases in brightness were the result. Among the cations partially substituted for $Ba^{+2}$ and/or $Ca^{+2}$ were $Zn^{+2}$, $Mg^{+2}$, $Sr^{+2}$, $Y^{+3}$ and $In^{+3}$ which produced only slight brightness decreases, while substitution of $Cd^{+2}$ and $La^{+3}$ gave drastic brightness decreases. The partial substitution of $GeO_4^{-4}$, $SiO_4^{-4}$, and $TiO_4^{-4}$ for $PO_4^{-3}$ also resulted in drastic brightness decreases.

Various fluxes have also been added to the optimized phosphor blend in order to further improve its brightness. Small amounts of $(NH_4)_2CO_3$, $NH_4F$, $H_3BO_3$, $NH_4Cl$, and $SO_4^=$ as $CaSO_4$ were the fluxes tried. All gave lower brightnesses for the air fired +6.0 stoichiometric formulation, while the brightness of the +5.71 positive charge stoichiometry formulation, which had to be fired in a reducing atmosphere, was unaffected.

As stated previously, the preferred composition for the brightest phosphor is $Ba_{.152}Ca_{2.528}(PO_4)_2$:$Ce_{.15}Mn_{.09}$. The composition and preparation parameters which may be varied and still give a good phosphor are given below.

1. Stoichiometry, as mentioned previously, is the most critical of the variables. As long as the total positive charge concentration is between +5.85 and +6.0, within the limits of the other variables listed below, a good stable red phosphor will result. Outside of these stoichiometric limits bright, stable, air-fired red-emitting phosphors cannot be prepared.

2. The Ba concentration may be varied between 0.1 and 0.45 moles as long as the Ca, Ce, and Mn concentrations are adjusted to meet the stoichiometric conditions stated in No. 1.

3. The Ce concentration may be varied between .05 and .25 moles, and the Mn concentration between .07 and 0.2 moles, again as long as the stoichiometric conditions in No. 1 are met.

4. The preferred firing times may vary between two and twenty-four hours, while the preferred firing temperatures may vary from about 1200° to 1350°C.

SPECIFIC EXAMPLE

The $Ba_{.152}Ca_{2.528}(PO_4)_2$:$Ce_{.15}Mn_{.09}$ phosphor is prepared by using the following standard luminescent materials with the indicated mole ratios and weights:

| Material | Moles | Grams |
|---|---|---|
| $CaHPO_4$ | 2.0 | 272.2 |
| $CaCO_3$ | .528 | 52.8 |
| $BaCO_3$ | .152 | 30.0 |
| $CeO_2$ | .150 | 25.8 |
| $MnCO_3$ | .09 | 10.3 |

The carefully weighed out materials are dry mixed in a Spex mixer mill with glass beads for 30 minutes. Then the mixture is placed in an uncovered 6 × 1 ½ × 2 inches fused silica boat and fired at 1300°C for three hours. For fluorescent lamp applications the caked phosphor is broken up and sieved through a 325-mesh screen prior to its use in the preparation of the lamp coating suspension.

In order to obtain improved lamp life, practically all phosphors that are used in fluorescent lamps usually undergo an additional washing procedure after the above sieving step. The $Ba_{.152}Ca_{2.582}(PO_4)_2$:$Ce_{.15}Mn_{.09}$ phosphor does not require this additional washing procedure since no improvement is obtained in either its lamp efficiency or in its already excellent lamp life when the phosphor is subjected to this washing step.

The following table gives the lumen data for 40 watt fluorescent lamps using the optimized stable air-fired $Ba_{.152}Ca_{2.582}(PO_4)_2$:$Ce_{.15}Mn_{.09}$ phosphor (positive charge concentration of +5.99), compared to the optimized unstable $Ba_{.35}Ca_{2.23}(PO_4)_2$:$Ce_{.1}Mn_{.12}$ phosphor (positive charge concentration of +5.7) obtained by firing in a reducing atmosphere. Magnesium fluorogermanate is included in the table for comparison.

| PHOSPHOR | INITIAL LUMENS | LUMENS AT 100 HOURS | % OF INITIAL LUMENS |
|---|---|---|---|
| $Ba_{.152}Ca_{2.528}(PO_4)_2$:$Ce_{.15}Mn_{.09}$ (air fired) | 553 | 533 | 96.5 |
| $Ba_{.35}Ca_{2.23}(PO_4)_2$:$Ce_{.1}Mn_{.12}$ (reducing atmosphere fired) | 482 | 416 | 86.3 |
| Magnesium fluorogermanate | 655 | 636 | 97.1 |

The data in this table not only show the superior life and stability of the air-fired phosphor, but also the poor life and instability of the reducing atmosphere fired material throughout lamp processing and lamp operation. Plaque test measurements of the above phosphors prior to use in fluorescent lamps showed the reducing atmosphere fired phosphor to be about 10 percent brighter than the air-fired phosphor. However, at zero hours in a lamp, the reducing atmosphere fired phosphor is about 15 percent less bright than the air-fired phosphor.

I claim:

1. A barium calcium orthophosphate phosphor activated by manganese and trivalent cerium, stable to fluorescent lamp processing and operation and to air firing, having the same crystalline structure as beta calcium orthophosphate and having the formula $$Ba_aCa_b(PO_4)_2:Ce_cMn_d$$

wherein a is between 0.1 and 0.45 moles, c is between 0.05 and 0.25 moles, d is between .07 and .2 moles, and b has such a value that the total positive charges of $Ba^{+2}$, $Ca^{+2}$, $Ce^{+3}$ and $Mn^{+2}$ is between 5.85 and 6.0.

2. The phosphor of claim 1 having the formula $Ba_{.152}Ca_{2.528}(PO_4)_2$:$Ce_{.15}Mn_{.09}$.

* * * * *